March 17, 1970     H. B. TAFT     3,500,526

PRODUCTION OF LARGE BEARINGS

Filed Jan. 3, 1967

INVENTOR
Howard B. Taft

United States Patent Office
3,500,526
Patented Mar. 17, 1970

3,500,526
PRODUCTION OF LARGE BEARINGS
Howard B. Taft, Pleasantville, Pa. (% Vertical Seal Company, Box 105, Titusville, Pa. 16354)
Filed Jan. 3, 1967, Ser. No. 607,063
Int. Cl. B21h 1/12
U.S. Cl. 29—149.5       10 Claims

ABSTRACT OF THE DISCLOSURE

A method for applying bearing metal to the bearing side of a bearing shell, the steps comprising tinning said bearing side, movably supporting said shell, damming the ends of said shell, applying heat directly to a surface portion of said bearing side to aid in adhesion thereof to said bearing metal, pouring a first pass of molten bearing metal onto said heated surface portion, immediately cooling the adjacent shell surface on the opposite side thereof to solidify rapidly said pass and to ensure adhesion thereof to said shell, and repeating the steps of applying heat, pouring and cooling to apply similar and adjacent passes until said passes cover the bearing side of said shell.

My present invention relates to producing bearings and especially lining and relining large bearings shells or the like with a suitable bearing and oil retention metal. More particularly the invention relates to the lining and relining of the very large diameter bearings such as employed for the backing up rolls of rolling mills used in the steel industry.

Previously it has been the practice to form the linings of the characterized bearings by pouring the molten bearing metal into place in the bearing sleeve with the aid of a suitable mandrel or other molding device, or by centrifugally casting by rotating the bearing shell about its axis while pouring the molten bearing metal therein. These methods have been found to be disadvantageous because of the awkward and inconvenient devices required and exposure of the operating personnel to burns resulting from inadvertent scattering of hot metal. Moreover, previous methods are not adapted for the production of very large bearings owing to the large amount of molten metal that must be utilized. Accordingly, these methods produced bearings in which the lining metal did not adhere properly to the bearing shell and in which the formation of slag and oxidized metal further impaired the bond between the bearing metal and the shell or became dispersed within the bearing metal to diminish the load carrying capacity thereof.

I am not unmindful of the patents to Hadley 2,670,509, Boegehold et al. 2,106,590 and Lyons 2,679,079, all of which relate to methods for lining bearings. However, all of these methods relate to the production of relatively small bearings wherein a comparatively small volume of molten bearing metal must be handled. None of the patents are suitable for the production of the aforementioned large bearings employed in rolling mills and the like and measuring in diameter up to 36 inches and more. For example the Lyons and Boegehold patents utilize internal mandrels or molding devices for the lining or relining of a bearing shell. The Hadley patent on the other hand relates to a method for lining a bearing shell by centrifugal casting. None of these patents can produce a satisfactory bearing of the dimensions contemplated by my present method because the large amount of molten bearing metal which must be handled at one time would prevent the proper cooling of bearing metal and the desired adhesion thereof to the bearing shell. Moreover, it would not be feasible to preheat the shell and the associated casting or molding complements properly, which is also essential to attaining the proper adhesion between the bearing metal lining and the bearing shell.

I overcome these difficulties and problems of the prior art by providing a roll table on which bearing shells of a very large diameter can be rotatably supported. A pair of dam rings are secured to the ends respectively of the bearing shell and the shell is periodically and angularly displaced so that the bearing metal can be poured into the shell and confined by the dam rings until solidified during a number of successive angular displacements or passes of the bearing shell. The bearing shell is pretinned in the conventional manner before supporting on the roll table, and the latter is provided with heating and cooling means for preheating and cooling the bearing shell before and after respectively each pass of molten metal to ensure adhesion of the bearing metal to the shell. During the heating step a portion of the preceding pass is remelted to ensure also the cohesion of a given pass to succeeding and subsequent passes of bearing metal. In accordance with one feature of my novel method the bearing shell is preheated internally before each pass and is cooled externally after each pass in order to promote optimum adhesion or bond between the lining and the shell.

During the foregoing discussion various objects, features and advantages of the invention have been alluded to. These and other objects, features and advantages of the invention will be elaborated upon during the forthcoming detailed description of certain presently preferred embodiments of the invention and certain presently preferred methods of practicing the same.

In the accompanying drawings I have shown certain presently preferred embodiments of the invention, together with presently preferred methods of practicing the same wherein.

Figure 1:
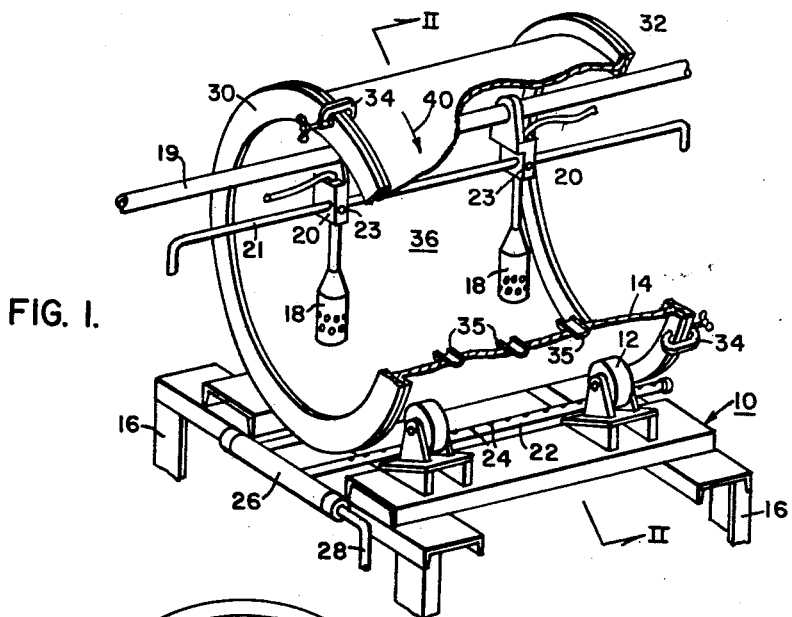
FIGURE 1 is a perspective view of a roll table arranged for rotatably supporting a large diameter bearing as shown therein.
Figure 2:
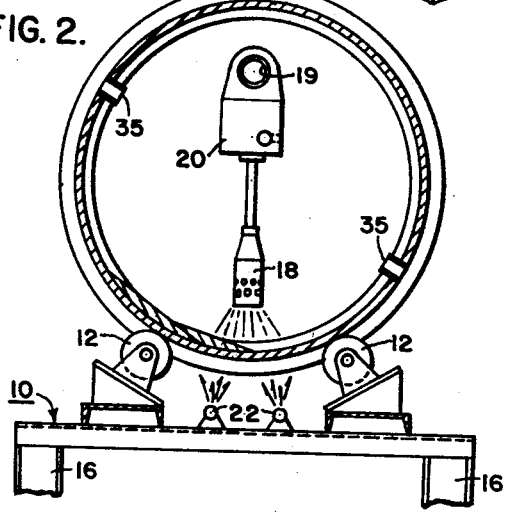
FIGURE 2 is an enlarged, cross-sectional view of the roll table and bearing shown in FIGURE 1 and taken along reference line II—II thereof.

Referring now more particularly with the drawings and initially to FIGURES 1 and 2 thereof, my method and means for producing large bearings includes a roll table denoted generally by the reference character 10. Supported on pairs of rollers 12 is a bearing shell 14 for rotation of the shell 14 relative to the roll table 10 either manually or by suitable means (not shown). The roll table 10 includes legs 16 and other supporting and stabilizing compounds as necessary to support the weight of the bearing shell 14 together with the masses of bearing metal which are successively added thereto in accordance with my invention.

For preheating the adjacent portion of the bearing shell 14 prior to each pass of molten bearing metal, suitable burner means 18 are provided and are slidably supported on support rod 19.

With the aforedescribed arrangement, the burners 18 can be moved axially of the shell 14 and hence along the length of each pass. In this example, two burners 18 are utilized, although the number can be varied depending upon the specific application of the invention. The burners 18 are depended from brackets 20, respectively, which are slidably mounted on support rod 19 and adjustably connected to push rod 21 by means of set screws 23. Desirably the push rod protrudes from each end of the shell 14 and is provided with dual handle means 25 to permit manipulation of the burner means 18 from either end of the shell 14. The individual burners can be spaced as required along the push rod 21 by manipulation of set screws 23. The method of heating the shell 14 prior to each pass will be set forth in greater detail hereinafter in connection with FIGURE 3 of the drawings. The bracket 20 desirably is mounted upon a suitable stand (not shown) which in turn can be supported on the roll table 10. Supported generally below the shell 14 are a plurality of perforated cooling tubes 22 which extend generally along the length and width of the completed pass of molten metal at the bottom of the shell 14 as viewed in the drawings. Air holes 24 in each tube 22 are sized and spaced so as to create a slight back pressure in order to impose a steady load on the compressor (not shown) or other suitable source of cooling fluid. The cooling tubes 22 in this example are coupled in communication with manifold 26 which in turn is communicated through valved conduit 28 to the aforementioned compressor or the like. For use in lining a bearing shell of about 36 inches in diameter the cooling tubes 22, which of course extend along the length of the shell are supplied in this example with air at about 125 p.s.i. in a volume of 200 to 300 c.f.m. Desirably, the segments 35 project inwardly of the shell 14 at least to the same extent as the inner diameters of the dam rings 30 and 32 as better shown in FIGURE 2. The tubular segments of course prevent the escape of molten metal through the shell lubricant apertures, which are thereby continued through the bearing metal.

In order to confine the molten bearing metal of each pass until it solidifies a pair of dam rings 30 and 32 are secured respectively to the ends of the bearing shell 14. In this example, the dam rings are secured by C-clamps 34, although other suitable clamping means can be employed. Additionally, short tubular segments 35 are inserted into the lubricating apertures of the bearing shell 14 to serve as dams when the related molten metal passes are poured. The manifold 26 can be provided with additional outlet openings 27 (FIGURE 4), normally closed by plugs 29, for changing the number of cooling tubes or the spatial arrangement thereof, as denoted by chain outlines 31.

The bearing metal with which the shell 14 is to be lined is deposited while molten in a series of passes within the shell 14, with result that the molten metal of each pass is confined at its ends by the dam rings 30, 32 and the initial pass at its sides and bottom by the arcuate inner configuration of the shell 14. After each pass of molten metal the shell 14 in engagement with table rollers 12 is rotated and angularly displaced a predetermined number of degrees, as detailed below, and suceeding passes of molten metal are added. However, before and after each pass the shell 14 is preheated and cooled respectively to secure the required adhesion or bond between the solidified bearing metal and the shell 14. The bearing material may be any of a variety of antifrictional metal linings commonly used for bearing purposes as habbit metal and other bearing alloys containing lead, tin, copper, zinc, antimony, etc. In the present example, a commonly used bearing metal containing 93% tin, 7% copper and antimony is employed.

In practicing my process the inner surface 36 of the bearing shell 14 is first cleaned and tinned in accordance with conventional procedures. For example the shell 14 after proper washing can be heated to about 600° F. in a suitable oven (not shown) and the tin applied with an appropriate flux. After proper tinning, the shell 14 is then placed horizontally on the roll table 10, whereupon the dam rings 30, 32 are secured to the ends of the shell as noted above. The inner diameter of the dam rings preferably is slightly less than the finished inside diameter of the lined bearing. The size of the rings 30, 32 therefore will vary with the size of the bearing shell to be lined. The dam rings 30, 32 serve to retain each pass of molten bearing metal at its ends within the proper portion in the shell 14.

Figure 3:
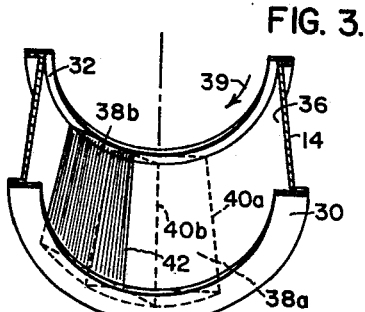
FIGURE 3 is an enlarged, partial perspective view of the apparatus shown in FIGURE 1.
Figure 4:
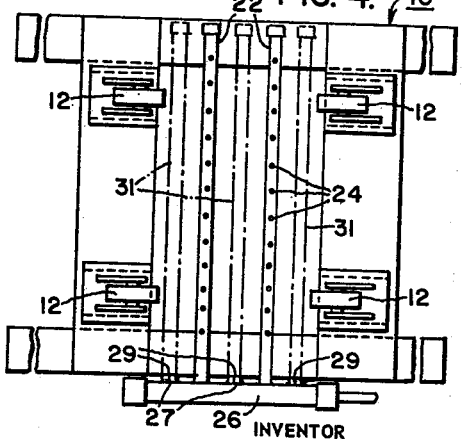
FIGURE 4 is a top plan view of the roll table shown in FIGURE 1, with the bearing removed.

When the shell 14 with the dam rings 30, 32 thus attached is supported on the roll table 10 the shell 14 is then heated in the lower area thereof as viewed in the drawings and preferably at an area defined by the dash outlined pass 38a of FIGURE 3. The shell 14 is heated to an extent sufficient to aid in bonding the molten bearing metal when the latter is poured into the lower area of the shell as defined by pass 38a. While the rings 30, 32 delineate the ends of the passes 38, the arc of the shell 14 defines the width of the pass on one side. The other side of the pass 38a is defined by the flat surface of the preceding pass 38b. The pass width of the molten metal is controlled, of course, by the amount of metal poured in each pass. After the pass 38a is poured to the desired width and thickness, the freshly poured metal and adjacent portion of the shell 14 is immediately cooled by means of compressed air flowing out of the openings 24 in the air tubes 22. The openings 24 are of course disposed to direct jets of air directly against the lowermost outer surfaces of the shell 14, i.e., adjacent pass 38a (FIGURES 3 and 4). The aforementioned compressor or a blower or fan can be utilized for this purpose. If additional cooling is required, water can be forced through the openings 24. With this arrangement that portion of the shell 14 adjacent the pass which has just been poured, i.e., the pass 38a, is cooled from the outside shell surface toward the center of the bearing, and the molten inner surface of the shell 14 with the result that the resultant shrinkage in the solidified metal will not pull the bearing metal away from the shell or create voids in the bearing metal. Desirably also, each pass is cooled as rapidly as possible which ensures requisite toughness of the bearing metal and improves its ability to hold or retain lubricant oil as well as carry greater loads.

Figure 5:
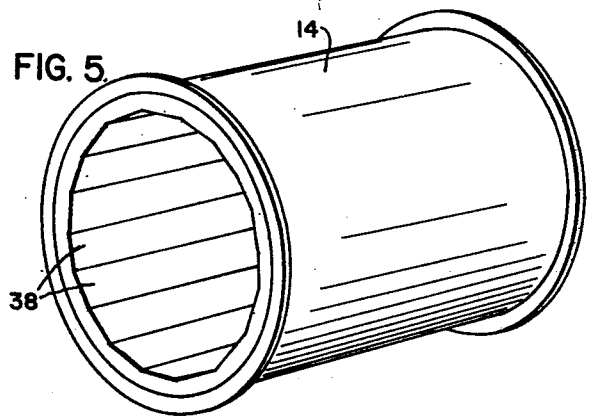
FIGURE 5 is an isometric view of a partially completed bearing produced in accordance with my invention.

When the bottommost pass 38a has cooled sufficiently to be completely solidified, the bearing shell 14 is rotated clockwise, in this example, as denoted by arrow 39 through an angular displacement (about 18° more or less depending on the total number of passes desired) with the result that the right hand edge 40b of the previous pass 38b (FIGURE 3) desirably is now located adjacent a vertical plane 41 passing through the rotational axis of the shell 14 as supported on roll table 10. The burners 18 are again operated to at least that portion of the internal surface of the shell 14 lying between the right hand edge 40b of the previous pass 38b and what will be the right hand edge 40a of the succeeding pass 38a to aid in bonding the succeeding pass of the molten metal to the shell 14. At the same time that right hand portion of the previous pass 38b, which will underlie the succeeding pass 38a, i.e. that portion lying between the left hand edge 42 of the flat or upper surface of the succeeding pass 38a and the center plane 41, is at least partially melted in order to assure cohesion to the succeeding pass 38a. When the bonding temperature of the adjacent portion of the shell 14 is reached and a sufficient quantity of the preceding pass 38b has been remelted, molten bearing metal is poured from a ladle (not shown) into the lower or heated zone of the bearing shell 14. The succeeding pass is poured to the height denoted by the dashed outline 38a thereof. It will be seen from FIGURE 3 that something less than about one-half of the preceding pass 38b then will be covered by the succeeding pass 38a depending on the thickness of the passes. The remainder of the succeeding pass 38a covers the previously heated portion of the shell 14. The poured pass 38a is immediately cooled as mentioned previously in connection with 38b, and the aforedescribed angular displacement of the shell 14 followed by pouring of additional molten metal passes is continued until the entire inner surface of the shell 14 is covered by the bearing metal. This arrangement produces a partially finished bearing, as shown in FIGURE 5 with a series of surfaces or passes 38 extending about its inner periphery. The flat surfaces resulting from passes 38 of the bearing are then machined by suitable conventional means (not shown) to convert the flatted inner surface of the bearing to a perfectly round contour of the desired diameter.

In the case of most large bearings the aforementioned angular displacement of about 18° after each pass of molten metal is adequate. However, such displacement can be varied according to the given size of the bearing and also the number of passes desired. It will be obvious, of course, that a larger number of passes will result in the removal of correspondingly less bearing metal during the subsequent machining operation to a round inner bearing contour. The dam rings 30, 32 and tubular dams 35 desirably are removed from the shell 14 prior to the subsequent machining operations.

With the aforedescribed arrangement and method, very large bearings can be lined or relined with a minimum of apparatus. Although the invention is not limited to a particular size or range of bearing sizes, it will be seen that it is particularly adapted for the production of very large bearing surfaces. In any case, it is not necessary to handle extremely large quantities of molten metal at one time, and thus the hazards attendant therewith are avoided. Moreover, the particular arrangement of molten metal applied to the shell 14 assures the toughest possible bearing material together with the requisite adhesion thereof to the shell 14, in addition to the necessary cohesiveness within the bearing metal itself.

It will be readily apparent that the method and apparatus described herein is adaptable not only for the production of new bearings but for relining or rebabbitting used shells that have been in service and, owing to age, distortion, movement of bearing metal or faulty metal or the like, require replacement of the bearing lining.

From the foregoing it will be apparent that novel and efficient forms of bearings, together with methods and apparatus for producing the same have been described herein. While I have shown and described certain presently preferred embodiments of the invention and have illustrated presently preferred methods of practicing the same, it is to be distinctly understood that the invention is not limited thereto, but may be otherwise variously embodied and practiced within the scope of the following claims.

I claim:
1. In a method for applying bearing metal to the bearing side of a bearing shell, the steps comprising tinning said bearing side, movably supporting said shell, damming the ends of said shell, applying heat directly to a surface portion of said bearing side to aid in adhesion thereof to said bearing metal, pouring a first pass of molten bearing metal onto said heated surface portion, immediately cooling the adjacent shell surface on the opposite side thereof to solidify rapidly said pass and to ensure adhesion thereof to said shell, and repeating the steps of applying heat, pouring, and cooling to apply similar and adjacent passes until said passes cover the bearing side of said shell.

2. The method according to claim 1 wherein said shell is cylindrical and rotatably supported, said bearing side is inwardly thereof, the inner diameters of said dams are less than the inner diameter of said bearing material when deposited in such shell, and said shell is preheated from within and is cooled from without.

3. The method according to claim 2 wherein said shell is heated from within by a source of heat movable generally over the area defined by a given one of said passes, and the adjacent outer surface of said shell is cooled by blowing jets of coolant thereagainst.

4. The method according to claim 2 wherein said shell is rotated through a given angular displacement such that each succeeding pass of molten metal covers a substantial portion of the preceding pass of said metal.

5. The method according to claim 4 wherein said portion of each preceding pass is heated from within said shell to melt at least partially said portion while heating the adjacent portion of said shell for each succeeding pass to assure adhesion between said passes and said shell and cohesion between the metal of adjacent passes.

6. The method according to claim 5 wherein said shell is cooled from without after each pass by cooling fluid applied to the outer surface thereof adjacent each heated shell portion and each associated partially melted portion of the preceding pass.

7. The method according to claim 2 wherein said shell is provided with lubricating apertures and said apertures are each dammed against escape of said molten metal therethrough.

8. The method according to claim 7 wherein said shell apertures are dammed at least to the height of said end dams above the inner diameter of said shell.

9. The method according to claim 2 wherein said end dams are removed after congealing of the last-poured of said passes, and the inner surfaces of said passes are machined to a continuous cylindrical surface.

10. In a method for applying bearing metal to the bearing side of a bearing shell, the steps comprising washing said bearing side, heating said bearing side to about 600° F., fluxing and tinning said bearing side, movably supporting said shell, ramming the ends of said shell, applying heat directly to a surface portion of said bearing side to aid in adhesion thereof to said bearing metal, pouring a first pass of molten bearing metal onto said heated surface portion, immediately cooling the adjacent shell surface on the opposite side thereof to solidify rapidly said pass and to ensure adhesion thereof to said shell, and repeating the steps of applying heat, pouring, and cooling until said passes cover the bearing side of said shell.

References Cited

UNITED STATES PATENTS

| | | | |
|---|---|---|---|
| 1,520,749 | 12/1924 | Brownrigg | 164—11 |
| 2,106,590 | 1/1938 | Boegehold et al. | 29—149.5 |
| 2,275,503 | 3/1942 | Brown | 29—52 |
| 2,289,703 | 7/1942 | Goerke et al. | 29—149 |
| 2,679,079 | 5/1954 | Lyons | 164—7 |

THOMAS H. EAGER, Primary Examiner

U.S. Cl. X.R.

29—527.1; 164—75, 118

UNITED STATES PATENT OFFICE
CERTIFICATE OF CORRECTION

Patent No. 3,500,526                                    March 17, 1970

Howard B. Taft

It is certified that error appears in the above identified patent and that said Letters Patent are hereby corrected as shown below:

Column 3, line 56, "suceeding" should read -- succeeding --; line 62, "habbit" should read -- babbit --. Column 6, line 41, "ramming" should read -- damming --.

Signed and sealed this 15th day of December 1970.

(SEAL)
Attest:

Edward M. Fletcher, Jr.                            WILLIAM E. SCHUYLER, JR.
Attesting Officer                                                Commissioner of Patents